US006612498B1

(12) United States Patent
Lipponen et al.

(10) Patent No.: US 6,612,498 B1
(45) Date of Patent: Sep. 2, 2003

(54) METHOD AND MEANS FOR USING ADDITIONAL CARDS IN A MOBILE STATION (75) Inventors: Markku Lipponen, Tampere (FI); Timo T. Laitinen, Viiala (FI); Ari Aho, Tampere (FI); Jarno Knuutila, Tampere (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/521,574

(22) Filed: Mar. 9, 2000

(30) Foreign Application Priority Data

Mar. 11, 1999 (FI) .................................................. 990543

(51) Int. Cl.⁷ .................................................. G06K 7/00
(52) U.S. Cl. ........................ 235/486; 235/441; 235/492
(58) Field of Search .................................. 235/441, 482, 235/483, 485, 486, 475, 492; 379/422; 455/90; 439/218, 626, 629, 630

(56) References Cited

U.S. PATENT DOCUMENTS

| 4,799,891 | A | | 1/1989 | Reichardt et al. ............. 439/43 |
| 4,869,672 | A | | 9/1989 | Andrews Jr. ................. 439/60 |
| 5,155,663 | A | * | 10/1992 | Harase |
| 5,336,877 | A | | 8/1994 | Raab et al. ................. 235/475 |
| 5,815,426 | A | | 9/1998 | Jigour et al. ................. 365/51 |
| 6,062,887 | A | | 5/2000 | Schuster et al. ............. 439/218 |
| 6,075,709 | A | * | 6/2000 | Yang |
| 6,224,391 | B1 | * | 5/2001 | Horie et al. |
| 6,264,506 | B1 | * | 7/2001 | Yasufuki et al. |
| 6,292,561 | B1 | * | 9/2001 | Benson |
| 6,343,945 | B1 | * | 2/2002 | Liikanen |

FOREIGN PATENT DOCUMENTS

| GB | 2298613 A | 9/1996 |
| WO | WO 97/26719 | 7/1997 |

OTHER PUBLICATIONS

ISO Standard 7816–2. May 15, 1998.
ScanDisk MMC—MultiMediaCard Production Information Sheets.
MultiMediaCard System—MMC mechanical specification sheets. Aug. 25, 1997.

* cited by examiner

Primary Examiner—Diane I. Lee
(74) Attorney, Agent, or Firm—Perman & Green, LLP (57) ABSTRACT A mobile station (MS) that includes an interface card slot (SLOT) to which it is possible to connect either an MMC-card or a small SIM-card. To connect the small interface card a separate adapter the size of an MMC-card is used, or, in addition to the first contact pins for use of an MMC-card, second contact pins for use of a SIM-card are arranged to the interface card slot. The operating voltage of the interface card is selected to fit the currently used interface card. In some embodiments of the present invention at least partially shared contact pins, which have been multiplexed, are being used to connect MMC- and SIM-cards.

20 Claims, 11 Drawing Sheets

METHOD AND MEANS FOR USING ADDITIONAL CARDS IN A MOBILE STATION

FIELD OF THE INVENTION

The present invention relates to connecting electronic interface cards into a mobile station.

BACKGROUND OF THE INVENTION

Nowadays, in mobile stations, to identify the subscriber it is common to use an interface card SIM (Subscriber Identification Module), which also usually contains non-volatile memory to store e.g. phone numbers. SIM-card comes in two standardised sizes, of which the smaller SIM-card is about 25 mm long, 14 mm wide and less than 1 mm thick, and its surface contains conductive surfaces arranged in a certain way. A mobile station using a SIM card has e.g. spring-loaded contact pins that form an electric contact with necessary contact surfaces and by using which the mobile station can electrically transmit information to the SIM-card and back to its own memory. A SIM-card comprises a control unit (CPU, Central Processing Unit), program memory (ROM, Read Only Memory), data memory suitable for long term storage (EEPROM, Electrically Erasable Programmable Read Only Memory) and data memory suitable for runtime storage (RAM, Random Access Memory). Using the mobile station requires keying in a personal identification number stored in a SIM-module when using the phone, most usually when switching the mobile station on. The data memory of the SIM-module can be used to store also other user-specific data such as phone numbers or messages etc.

Due to the rapid development of information technology, new mobile stations will contain an increasing number of computer-like features. They need more and more so-called RAM-memory (Random Access Memory) to serve as working memory, and peripheral devices familiar from microcomputers will possibly be also used in mobile stations. However, mobile stations are often required to be designed and manufactured so small and light that the user can transport them whenever he/she likes, e.g. in a belt pouch. In this case the solutions known from portable microcomputers easily lead to too large a size and too high a weight for use, and that is why Nokia Mobile Phones Ltd. has brought out to market a new mobile phone model called Nokia 9110 Communicator, which combines a portable computer and a mobile station into a compact unit. This device is capable of using new multimedia cards (SanDisk MultiMediaCard) to increase the working memory of the device. Additionally programs or e.g. the own telephone catalogue of the firm can be stored on the multimedia card. Below the SanDisk multimedia card will be referred to with the abbreviation MMC-card. The length of MMC-card is 32 mm, width 24 mm and thickness 1,4 mm. For these cards the Nokia 9110 Communicator contains a separate interface card slot, where the MMC-card can be placed.

In the future a second small SIM-card can be attached to mobile stations. With two SIM-cards the user can use the services of two different mobile communication networks. However, the second SIM-card requires its own interface card slot. If the mobile station also contains an interface card slot for an MMC-card, it will need three different interface card slots. Every interface card slot yet requires its own space and means for using the cards attached to it. In addition to different purpose, the physical measurements, grouping of contact surfaces and operating voltages of SIM- and MMC-cards are different.

A connecting device with which different sizes of interface cards can be used is known from patent publication U.S. Pat. No. 5,336,877. The publication presents an invention, where a small SIM-card is aligned with a separate adapter so that its contact surfaces connect with the contact pins meant for using larger interface cards. However the contacts have to be in the same order with respect to their purpose of use and their pitch has to be corresponding, even though it seems possible to connect a card that lacks a part of the contacts of the larger card into the device according to the publication. The purpose of the invention according to the publication is indeed to adapt two different types of phone cards to be used in the same phone.

SUMMARY OF THE INVENTION

Now a mobile station has been invented, which mobile station comprises an interface card slot, which can be used to connect alternatively a small SIM-card or a Sandisk MMC-card to the mobile station. The mobile station has means for physically and electrically adapting a small plug-in SIM-card known from the GSM to an interface card slot for an MMC-card and of the size of MMC-card's, in order to be used as a SIM-card when the MMC-card is not present in the interface card slot. Furthermore, the mobile station has means for making the mobile station use the SIM- or MMC-card currently present in the interface card slot in a way akin to the use of that card in said interface card slot.

An interface-card slot of a mobile station, according to the present invention, comprises mechanical support for holding in place, during the normal use of the mobile station an at least partially inserted SIM- or MMC-card. Additionally, the mobile station comprises connecting means to connect the used contact surfaces of the current interface card with the mobile station's electronics controlling and using the interface card. Connecting means comprise at least contact devices corresponding to the grouping of an MMC-card's contact surfaces in order to connect an MMC-card and, in certain embodiments, a group of contact devices in order to connect a SIM-card's contact surfaces into the mobile station. In these embodiments part of or all SIM-card's contact surfaces can optionally be connected through contact devices meant for MMC-cards e.g. by using and adapter card changing SIM-card into the size of MMC card and comprising a group of contact surfaces conforming to the grouping of the contact surfaces of an MMC-card. In this case a mobile station also comprises means for identifying the current interface card in order to identify an operating voltage suitable to the current interface card and to route the connection of the contact surfaces of the interface card in such a way that the mobile station can use the interface card. An interface card slot according to a first embodiment of the present invention comprises separate contact pins for using SIM- and MMC-cards. A part of the contact pins of a mobile station's interface card slot according to a second embodiment of the present invention are common i.e. multiplexed. All of the contact pins of a mobile station's interface card slot according to a third embodiment of the present invention are common i.e. multiplexed and the contact surfaces of a SIM-card are made to correspond the grouping of the contact surfaces of an MMC-card by means of an adapter.

According to a first embodiment of the present invention a mobile station is provided, comprising an interface card slot for using an MMC-multimediacard (SanDisk MMC-MultiMediaCard), which MMC-card comprises, on it's outer surface, a first group of grouped contact surfaces for data transfer and power supply;

a first voltage supply to give a defined first voltage;

a data transmission means for reading data from an MMC-card and for writing data on an MMC-card;

and which interface card slot comprises:

walls defining a first space receiving at least partially an MMC-card, and a first attaching means for attaching an MMC-card detachably to said space;

a first connecting means for connecting a first voltage to a certain contact surface of an MMC-card;

a second connecting means for connecting the data transmission means to a certain contact surface of the MMC-card, wherein the mobile station further comprises:

a second attaching means for attaching a SIM-card to said first space, which SIM-card has a grouped second group of contact surfaces;

a second voltage supply for giving a defined second voltage;

a third connecting means for connecting said second voltage into a certain contact surface of the SIM-card;

a fourth connecting means for connecting said data transmission means to a certain contact surface of the SIM-card.

A mobile station according to a second embodiment of the present invention is characterised in that the mobile station comprises an interface card slot for swappable interface cards of mechanically and electrically two types, for interface cards of a first and a second type, which interface cards have a certain size, use and contact surfaces grouped in a certain way according to their type, where the size, use and grouping of contact surfaces of these interface cards deviate from each other, a first contact device for making contact with the contact surface of an interface card of the first type, a second contact device for making contact with the contact surface of an interface card of the second type, a means for attaching an interface card of the first type detachably into the interface card slot, a means for attaching an interface card of the second type detachably into the interface card slot, and a means for indicating the type of the interface card to the mobile station based on the difference between the interface cards, in order to allow the mobile station to use the interface card attached to it.

For a method according to the present invention, where the interface card slot of a mobile station is mechanically and electrically adapted to fit two types of replaceable interface cards and the size and the grouping of contact surfaces of these interface cards deviates from each other, characterised in that an interface card of first or second type attaching to the interface card slot, interface cards of the first type are connected to the mobile station by using a first group of contact devices, interface cards of the second type are connecting to the mobile station by using a second group of contact devices, and the type of the current interface card indicating to the mobile station so enabling the mobile station to use the interface card connecting it.

BRIEF DESCRIPTION OF THE DRAWINGS

The invention explained in detail in the following with reference to the enclosed drawings, where

FIG. 2a1 presents a group connector of an interface: card slot of a mobile station according to the first aspect of a first embodiment of the present invention, viewed from above;

FIG. 2a2 presents a group connector of an interface card slot of a mobile station according to the second aspect of a first embodiment of the present invention, viewed from above;

FIG. 7c1 presents a first connection of the group connector of FIG. 2c to an ASIC-circuit controlling it;

FIG. 7c2 presents one second connection of the group connector of FIG. 2c and the ASIC-circuit controlling it;

DETAILED DESCRIPTION

Figure 1A:
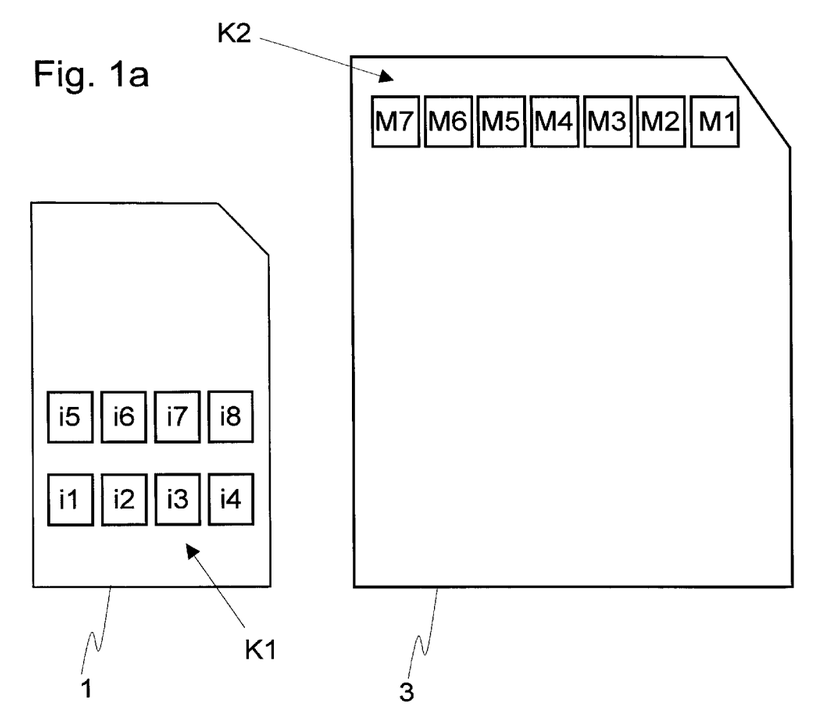
FIG. 1a presents a small SIM-card and its contact surfaces and an MMC-card and its contact surfaces viewed from above.

FIG. 1a presents a small SIM-card 1 and on it a grouping of contact surfaces according to ISO standard 7816-2:1998 and an MMC-card 3 and grouping of its contact surfaces. On the SIM-card there are eight contact surfaces divided into two straight parallel rows each containing four contact surfaces with equal distances. All the seven contact surfaces of an MMC-card are in one straight row with equal distances. The contact surfaces of both cards in one row are divided with roughly the same pitch. The contact surfaces of a SIM-card are numbered consecutively with references I1

...8 a row and the contact surfaces of an MMCcard have been numbered consecutively with references M1 ... M7. The distance between the centre points of the contact surfaces of a SIM-card, or their pitch, is 2,54 mm and the corresponding gauge of the contact surfaces of an MMC-card is 2,5 mm. Therefore the contact surfaces of one row of a SIM-card can be connected with same contact pins that can be used to contact four out of seven contact surfaces of an MMC-card. Said ISO-standard defines the contact surfaces 4 and 8 of a SIM-card reserved for future use, and they do not necessarily have to be used. The uses for the contact surfaces of a SIM-card are presented in table I and the uses for the contact surfaces of an MMC-card are presented in table II.

TABLE I

The uses of the contact surfaces of a SIM-card

| Contact surface | Use | Abbreviation |
| --- | --- | --- |
| i1 | Supply Voltage | Vcc |
| i2 | Reset | SIM_RST |
| i3 | Clock Signal | SIM_CLK |
| i4 | unused | |
| i5 | Ground | GND |
| i6 | unused | |
| i7 | Data I/O | SIM_DATA |
| i8 | unused | |

TABLE II

The uses of the contact surfaces of an MMC-card

| Contact surface | Use | Abbreviation |
| --- | --- | --- |
| M1 | Program Voltage | Vpp |
| M2 | Command Line | MMC_CMD |
| M3 | Supply Voltage Ground | GND |
| M4 | Supply Voltage | Vcc |
| M5 | Clock | MMC_CLK |
| M6 | Supply Voltage Ground | GND |
| M7 | Data Line | MMC_DATA |

Figure 1B:
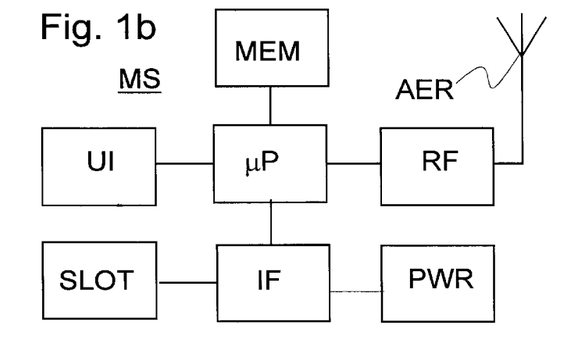
FIG. 1b presents a block diagram of a mobile station according to the present invention.

FIG. 1b presents as a block diagram the structure of a mobile station according to the present invention. The mobile station MS comprises a radio part RF and an aerial AER for sending and receiving radio messages and a processor µP for controlling the mobile station, a memory MEM for storing the operations program of the processor, an user interface U1 for operating the mobile station and a connection interface for connecting the interface card slot SLOT to the mobile station. In addition the mobile station comprises a voltage supply PWR, which supplies operating voltage to the interface card to be connected into the interface card slot through the connection interface. The voltage supply is preferably two different voltage outputs of the power source of the mobile station or a certain controllable voltage output arranged with a special power supply circuit, the voltage of which can be adapted to fit the current interface card.

Figure 1C:
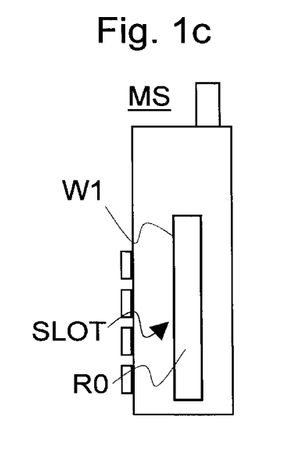
FIG. 1c presents the structure of a mobile station according to the present invention, viewed from the side.

FIG. 1c presents the structure of a mobile station according to the present invention. An interface card slot SLOT has been integrated into the mobile station. The interface card slot comprises a space R0 confined by walls W1, which space is arranged to contain either an MMC- or a SIM-card. At least some of the walls W1 are preferably parts that otherwise belong to the structure of the mobile station. One wall can be e.g. a part of the cover of the mobile station, a component residing inside the mobile station, a part of a circuit board, or a bar attached to the mobile station made for an interface card, which bar supports an interface card slid into the interface card slot from one side. The walls do not have to be solid, but they can be formed from net, at least one bar, or with other structures, known to a man skilled in the art, that are suitable for repeatedly attaching pieces. In all events, a space for an interface card placed inside a mobile station has to be reserved, which space is at least the size of the part of an interface card entering the inside of a mobile station when the interface card is inserted in the mobile station. The space can be arranged to decrease, though, when the interface card slot is empty, e.g. by means of a spring-loaded mobile wall.

The FIGS. 2a1, 2a2, 2b and 2c present the group connectors meant for SIM- and MMC-cards, according to three separate embodiments of the present invention, which connectors are to be soldered onto the circuit board of an interface card slot common for SIM- and MMC-cards. Each group connector is a preferably plastic piece that has a group of flexible contact pins protruding from their upper surface and electrically insulated from each other. The contact pins have been connected to the soldering pins in the lower edge of the group connector, on one of its sides, in such a way that they can be soldered into the soldering points of the circuit board underneath the group connector. In a group connector according to a first embodiment of the present invention the connectors have not been multiplexed, but the SIM- and MMC-cards have separate connectors. In a group connector according to a second embodiment of the present invention a part of the connectors have been multiplexed. In a group connector according to a third embodiment of the present invention all connectors of the SIM-card have been multiplexed with the connectors of the MMC-card using a special adapter.

Figure 2A:
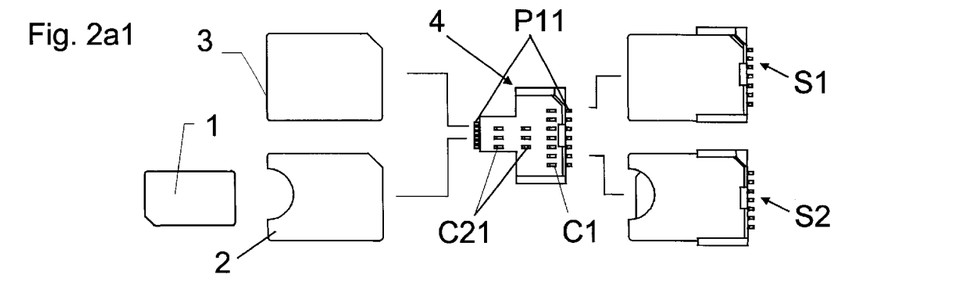
Figure 2A:
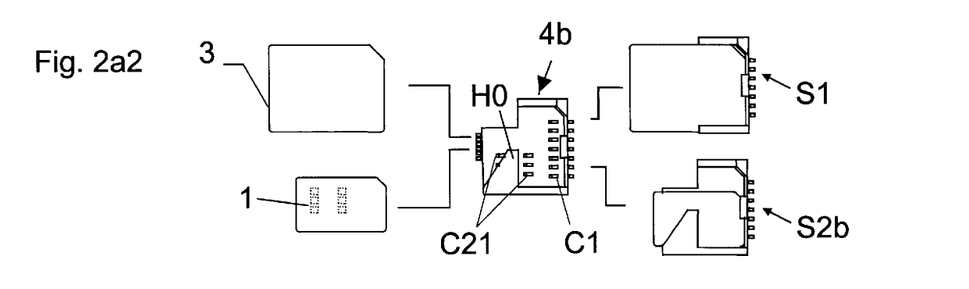

FIG. 2a1 presents, according to the first aspect of a first embodiment of the present invention, a small SIM-card 1, an adapter 2 with outer dimensions the size of an MMC-card meant for the SIM-card, an MMC-card 3 and a first group connector 4 and an MMC-card installed into its place in the group connector as first system S1 and a small SIM-card installed into its place in the group connector as second system S2. The group connector comprises in its front edge (in the right side in the FIG.) an MMC-connector row C1 meant for the contact surfaces of an MMC-card, in order to use an MMC-card, and in its middle section a first group of connectors C21 grouped in correspondence to the grouping of the contact surfaces of a SIM-card. The MMC-connector row has 7 connectors and the first connector group has 6 connectors. Connectors meant to use of both SIM- and MMC-cards are preferably bent copper leads protruding from the group connectors, that continue inside the group connector and, with their other ends, form to the side of the group connector in its lower edge first soldering pins P11 in order to connect the connectors onto the soldering points of a circuit board arranged underneath the group connector. In this way the necessary contact surfaces of an interface card attached to the interface card slot for the group connector can be connected to the means of the mobile station, using the interface card, which means are explained later.

An MMC-card can be installed into an interface card slot according to FIG. 2a1 as such, but a SIM-card must first be placed into an adapter 2 of the size of an MMC-card and the adapter comprising the SIM card is placed into group connector 4 instead of an MMC-card. Thus the adapter holds the SIM-card in place and connectors in connector group C21 make contact to the contact surfaces K1 of the SIM-card.

FIG. 2a2 presents a modification of a group connector, according to FIG. 2a1, of an interface card slot, in which version it is possible to place a SIM-card without an adapter against the group of connectors C21 meant for it. In the figure the connector group has been moved closer to the edge of the group connector. A SIM-card is slid into place along the edge of the group connector and pushed until the end of the group connector. In order to hold a SIM-card in place, a holder H0 reaches over the SIM-card from the side of the group connector, which holder is preferably a flexible plastic extension formed to the edge of the group connector, and which holder has been arranged to lightly squeeze the SIM- or MMC-card placed in the interface card slot to hold especially a SIM-card in place. For the sake of clarity the contact surfaces under the card have been drawn on the SIM-card 1 with dash lines. The connectors of the group connectors make contact with the contact surfaces of a SIM-card placed in the group connector. In this version the essential difference to the structure in FIG. 2a1 is in that a SIM-card can be used without a separate adapter card which could be lost or forgotten and thus block the use of the SIM-card. In this example the interface card slot has been arranged to receive the SIM-card slanted edge first, so that the contact surfaces of the SIM-card would not touch the contact pins C1. In this way it is possible to arrange separate contact pins for SIM- and MMC-cards.

Figure 2B:
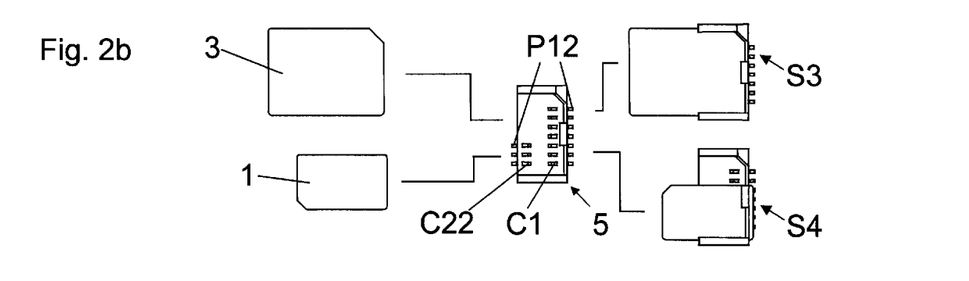
FIG. 2b presents the group connector of an interface card slot of a mobile station according to a second embodiment of the present invention, viewed from above.

FIG. 2b presents a small SIM-card 1, an MMC-card 3 and one second group connector 5 according to the second embodiment of the present invention along with an MMC-card placed in the second group connector as a third system S3 and a small SIM-card placed in the second group connector as a fourth system S4. The group connector comprises, on it's front edge, a connector row C1 and another connector group C22, parallel to the connector row C1, with three contact pins with a pitch of 2,54cm, meant to connect a SIM-card. The connectors of the connector group C22 are directly opposite to the connector row on the level of the three connectors in such a way, that the connectors in the connector group C22 can make contact with the three contact surfaces of one connector row on a SIM-card placed on the group connector with contact surfaces facing down, while the three connectors in connector row C1 make contact with the three other contact surfaces on the SIM-card. Soldering pins P12 have been arranged for connector rows C1 and C22 in order to connect them onto the circuit board.

Figure 2C:
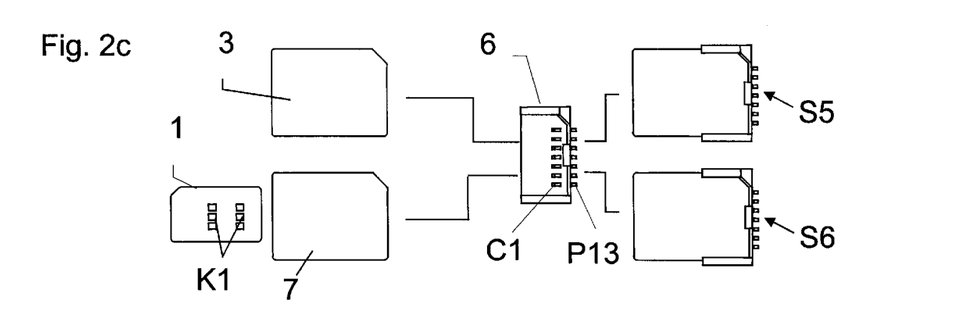
FIG. 2c presents the group connector of an interface card slot of a mobile station according to a third embodiment of the present invention, viewed from above.

FIG. 2c presents a small SIM-card 1, an MMC-card 3 and a third group 5 connector 5 according to the third embodiment of the present invention along with an MMC-card placed in the third group connector as a fifth system S5 and a small SIM-card placed in the second group connector as a sixth system S6. A SIM-card is adapted to the size of an MMC-card and contact surfaces corresponding to those of an MMC-cards are arranged for it by means of a second adapter 7. The second adapter is like an MMC-card in size and shape and it has a depression, where a SIM-card fits. In the bottom of the depression, in the second adapter there are connectors C23 corresponding to the contact surfaces of a SIM-card that fits in the depression only in one orientation. The connectors C23 have in the second adapter leads, with which each of the six used connectors is connected to the contact surfaces of the second adapter corresponding to an MMC-card, as presented later. The third group connector 6 comprises a connector row C1 and soldering pins P13 to connect its connectors to a circuit board.

Figure 3A:
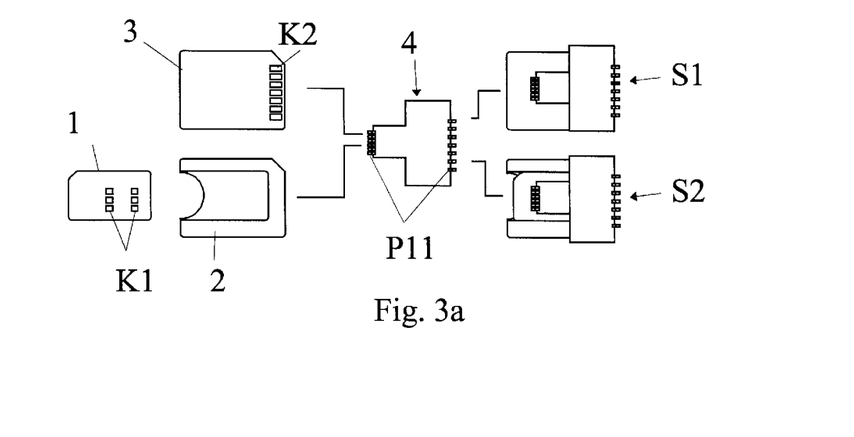
FIG. 3a presents the group connector of FIG. 2a from below.
Figure 3B:
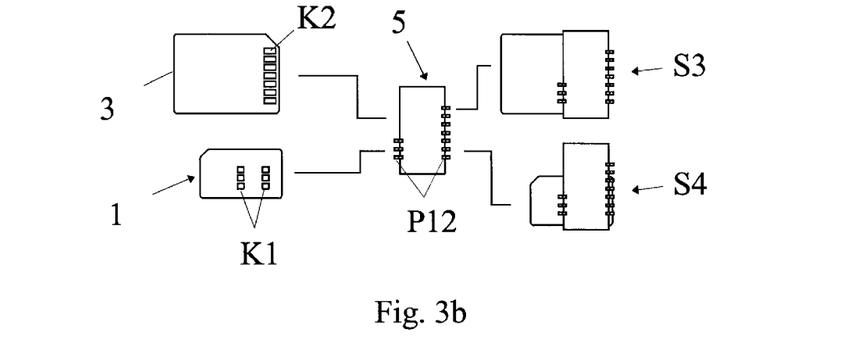
FIG. 3b presents the group connector of FIG. 2b from below.

FIGS. 3a and 3b present the group connectors of FIGS. 2a1 and 2b viewed from below. The contact surfaces K1 and K2 of the SIM- and MMC-cards as well as the soldering pins are in these figures upwards from the level of the paper.

Figure 3C:
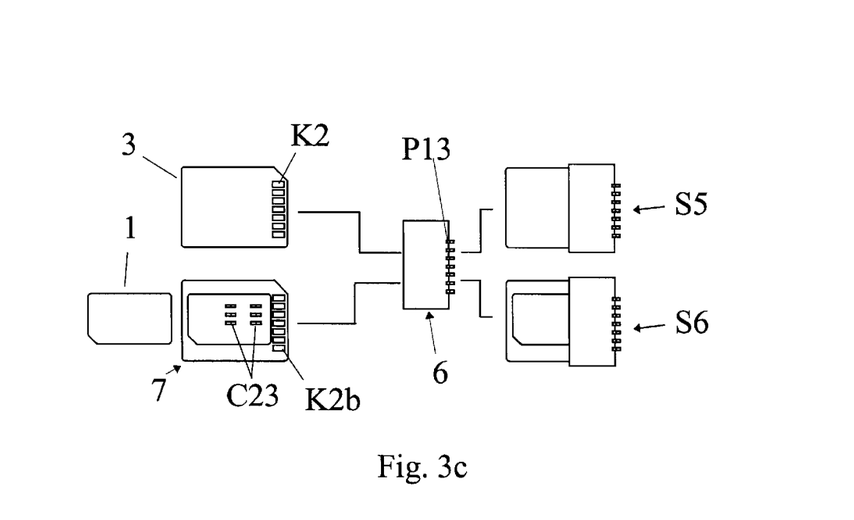
FIG. 3c presents the group connector of FIG. 2c from below.

FIG. 3c presents the group connector of FIG. 2c viewed from below. The connectors C23 of the second adapter, meant for a SIM-card, as well as the contact surfaces K2b of the adapter's MMC-card slot, meant for using an MMC-card, are visible in the figure.

Figure 4A:
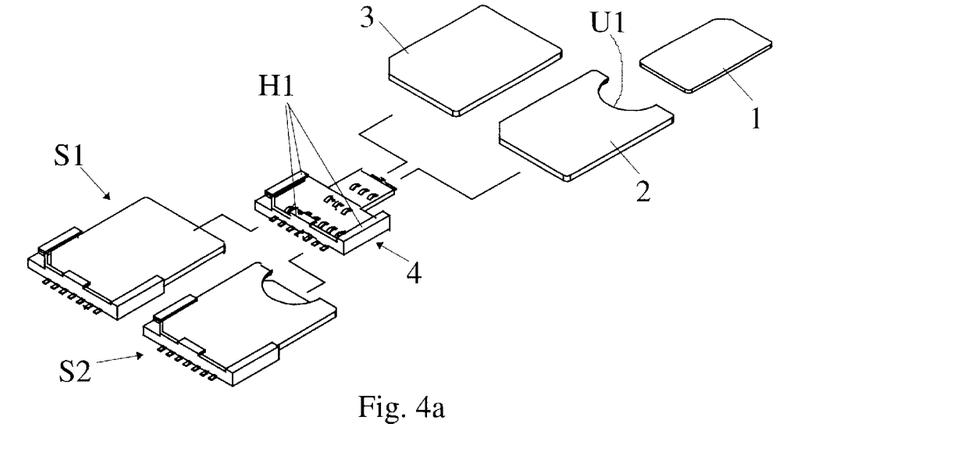
FIG. 4a presents the group connector of FIG. 2a from obliquely above.
Figure 4B:
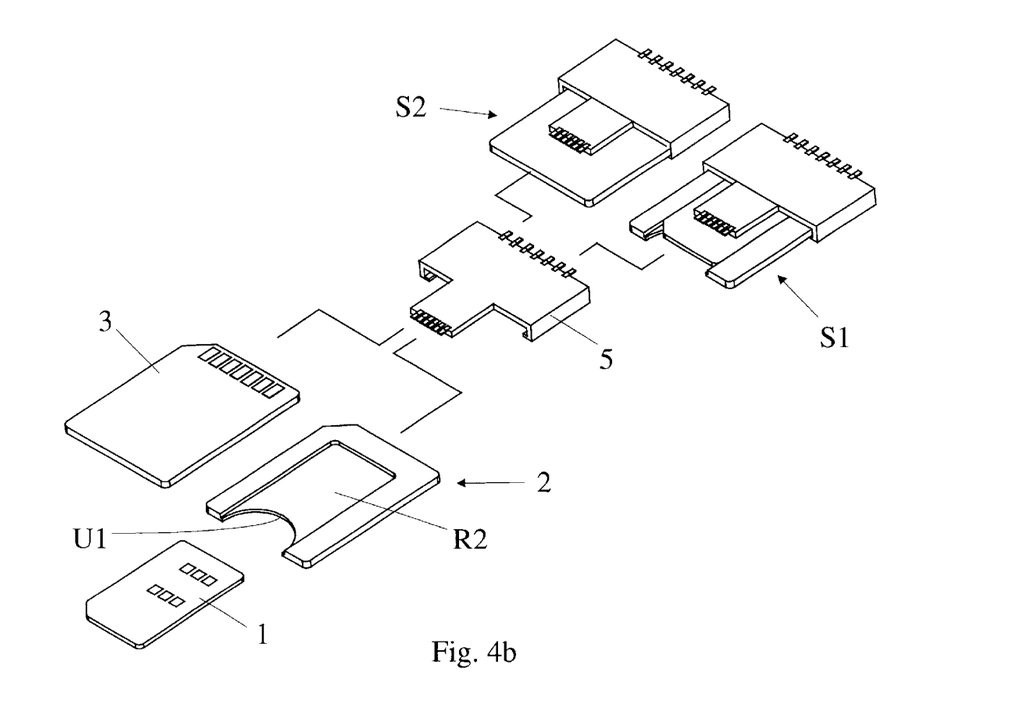
FIG. 4b presents the group connector of FIG. 2a from obliquely below.

FIGS. 4a and 4b present the second group connector of FIG. 2a1 and a SIM-and an MMC-card viewed obliquely from above and obliquely from below. The figures show a groove U1 in the shape of a semicircle formed into the back edge of the first adapter and the space R2 to contain a SIM-card. The groove reveals about 5 mm of a SIM-card placed into space R2. On the groove it is easy to take hold of the card and to remove the card from the adapter. Additionally FIG. 4a presents the holding pegs H1 of the first group connector 4 that hold an MMC-card or a first adapter plugged into the group connector against the connectors of the group connector. The holding pegs H1 reach some 2 mm from the edges of the space left for an MMC-card towards the centre of the space about in the direction of the level of the card and about an amount equal to the card's thickness above the bottom of the group connector.

Figure 5A:
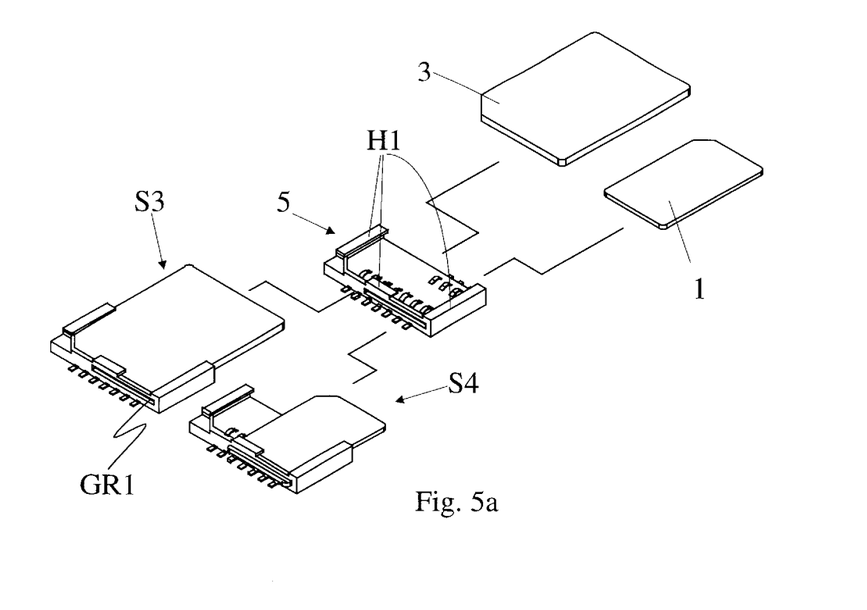
FIG. 5a presents the group connector of FIG. 2b from obliquely above.
Figure 5B:
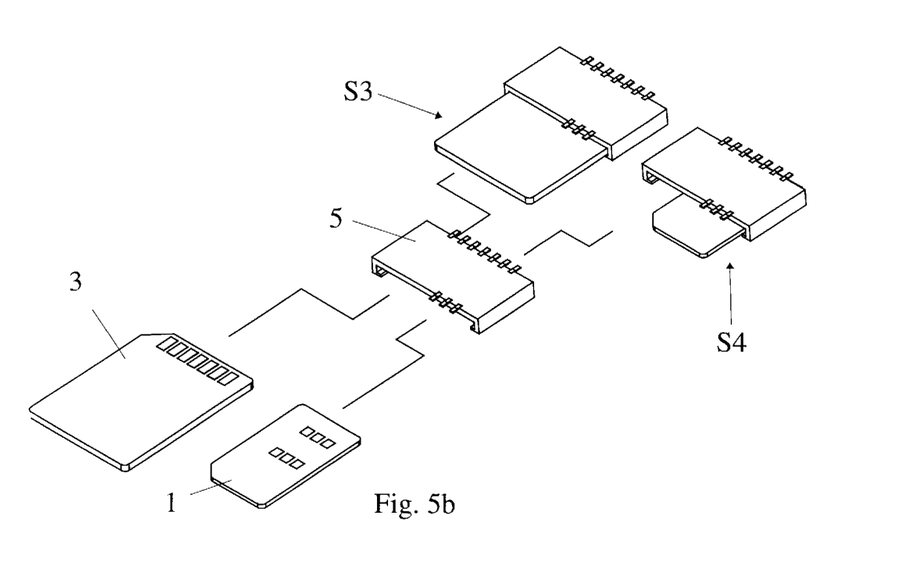
FIG. 5b presents the group connector of FIG. 2b from obliquely below.

FIGS. 5a and 5b present the second group connector of FIG. 2b, a SIM-card and an MMC-card viewed from above and to the side and from below and to the side. FIG. 5a presents the pegs H1 of the second group connector 5 in order to hold a SIM- or MMC-card placed in the interface card slot in place. The second group connector comprises, in this example, also a groove GR1, to which the end of a SIM-card fits tightly, thus improving the sideways support of a SIM-card while securing that the contact surfaces of a SIM-card stay in position against the contact pins. In this way it is also possible to better fit the contact surfaces i1–i4 of a SIM-card against the contact surfaces C1 (FIG. 2b) of the group connector, because the contact surfaces i1–i4 of a small SIM-card, on the side of the edge of a SIM-card, are slightly farther from the edge of the card that the contact surfaces M1–M7 of an MMC-card are from the edge of an MMC-card. A corresponding structure, where a SIM-card enter slightly deeper than an MMC and where a SIM-card receives sideways support at the end away from the group connector, can be devised in a number of ways evident to a person skilled in the art. It is e.g. possible to form a jag to the edge of the group connector or to the bottom of the group connector beside the edge, beside the centre side edge of groove GR1 visible in FIG. 5a. Thus the jag restricts the depth of the entry of an MMC-card into the group connector whereas a SIM-card settles against the edge of the group connector beside the jag. Alternatively the group connector 5 could comprise a slightly protruding (e.g. by 1 mm) flexible bar, which would be pressed down under an MMC-card, but would stay in place beside a SIM-card to support the SIM-card sideways.

Figure 6A:
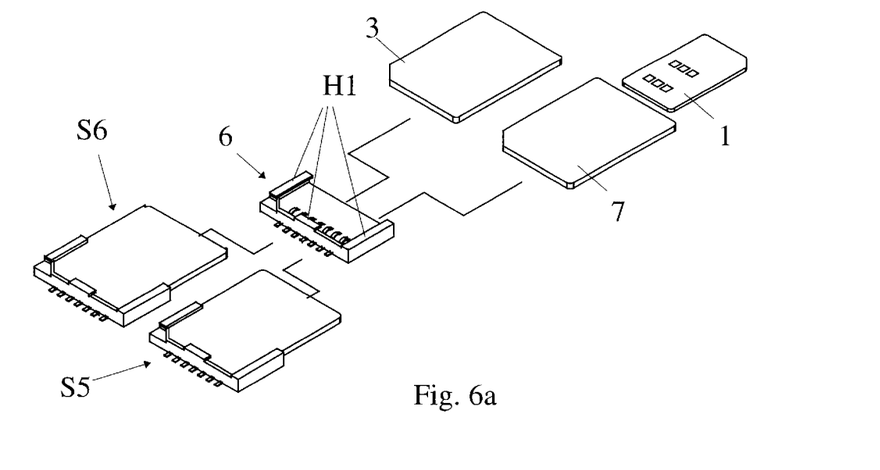
FIG. 6a presents the group connector of FIG. 2c from obliquely above.
Figure 6B:
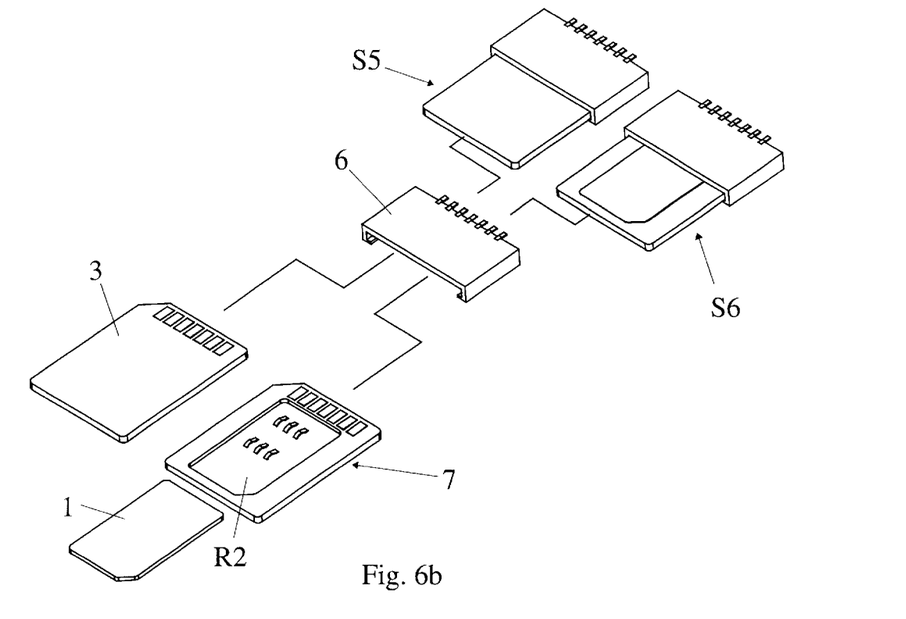
FIG. 6b presents the group connector of FIG. 2c from obliquely below.

FIGS. 6a and 6b present the third group connector of FIG. 2c and a SIM- and an MMC-card viewed from above and to the side as well as from below and to the side. FIG. 6bpresents how a space R2 with the size and shape of a SIM-card 1 has been formed into the adapter 7, to the bottom of which space connectors to use a SIM-card have been placed in positions corresponding to contact surfaces of a SIM-card. When placed in the third group connector 6 a SIM-card cannot fall from its adapter, because it is caught by its front pare between the adapter and the bottom of the group connector.

Figure 7A:
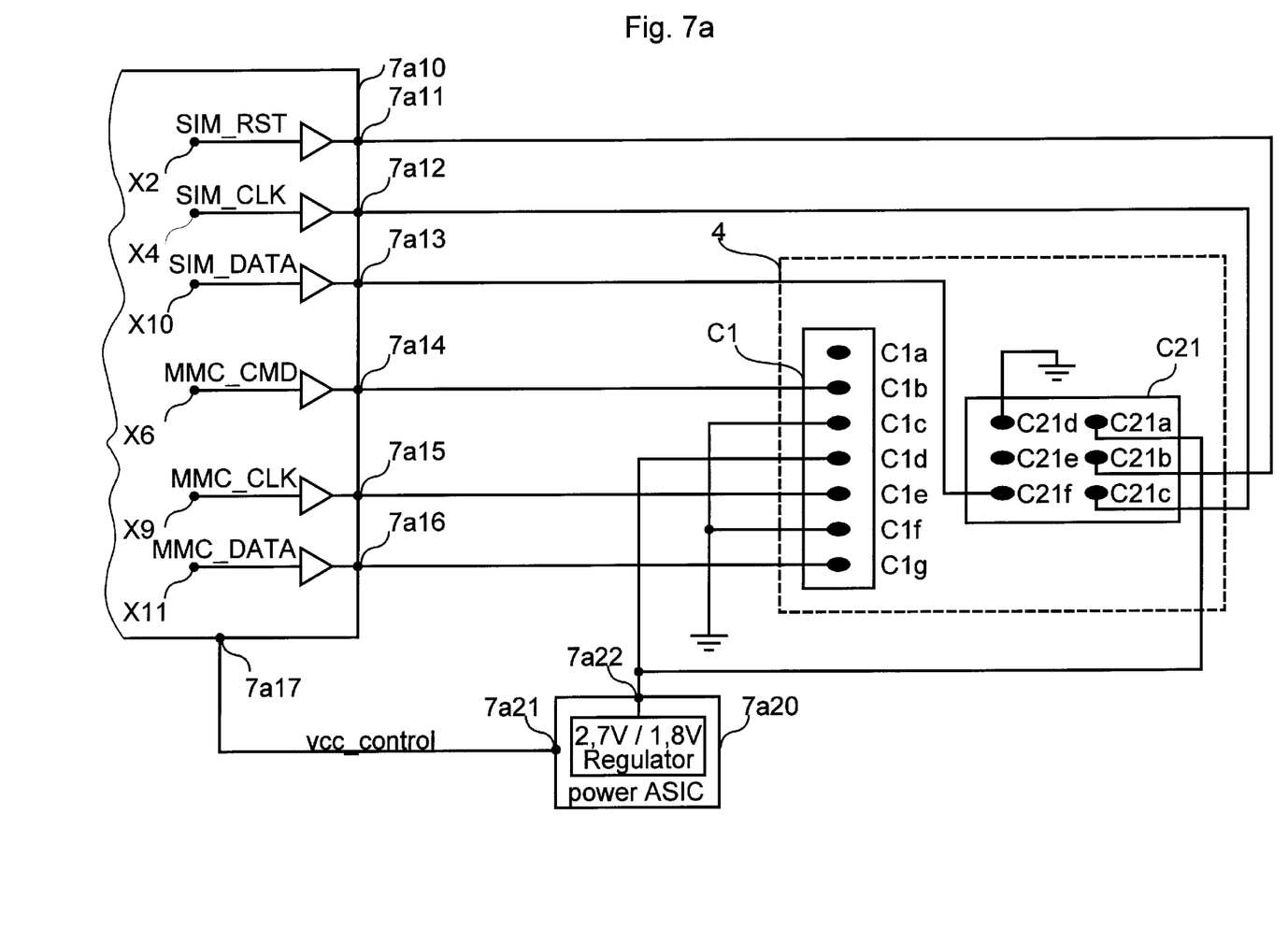
FIG. 7a presents the connection of the group connector of FIG. 2a to an ASIC-circuit controlling it.

FIG. 7a presents the connection of one group connector according to the first embodiment of the present invention, meant for SIM- and MMC-cards. The mobile station comprises for the use of SIM- and MMC-cards a first ASIC-circuit 7a10, which controls the interface cards placed in the interface card slot. The circuit has connections 7a11–7a17. The channels and the corresponding leads and contact surfaces of the mobile station, meant for the use of SIM- and MMC-cards and connected to the processor of the mobile station, are presented in Table III.

TABLE III

The connection of contact pins according to the arrangement in FIG. 2a1

| Channel reference | Channel name | ASIC-output | Contact pin |
|---|---|---|---|
| X2 | SIM_RST | 7a11 | C21b |
| X4 | SIM_CLK | 7a12 | C21c |
| X10 | SIM_DATA | 7a13 | C21f |
| X6 | MMC_CMD | 7a14 | C1b |
| X9 | MMC_CLK | 7a15 | C1e |
| X11 | MMC_DATA | 7a16 | C1g |
|  | Control | 7a17 | C1d/C21a |

Power supply to the interface card has been arranged of the connection interface connection 7a17 by controlling power supply ASIC 7a20, which preferably is e.g. 2.7 V/1.8 V Regulator Power ASIC, i.e. a circuit, the output of which can be selected to a voltage suitable for either a SIM- or an MMC-card, e.g. 2.7 V or 1.8 V. Power supply ASIC has an input 7a21, with which it receives control to select a voltage from connection 7a17. The circuit has an output 7a22, which has been connected to both the centremost contact surface C1d of a SIM-card, reserved for supply voltage, and to the contact surface C21a of an MMC-card, reserved for supply voltage. Alternatively two separate: outputs for a SIM- and an MMC-card can be arranged to the power supply circuit, and take into use the output suitable for the card currently in use.

The contact surfaces C1c and C1f of an MMC-card have been grounded as has the contact surface C21d of a SIM-card. The mobile station records the presence of a card in the interface card slot preferably by e.g. using a designated microswitch and identifies the card type by first trying to use it as a card of the first type and, if failed, to use it as a card of the second type. Alternatively e.g. a second microswitch or a connection made by a card put into place makes by means of designated connection devices such as microswitches can be used to identify the card type. Furthermore, one option is to leave the recognition of the card type to the user. In this case the user is given a possibility via the user interface to indicate to the mobile station the type of the current interface card.

Figure 7B:
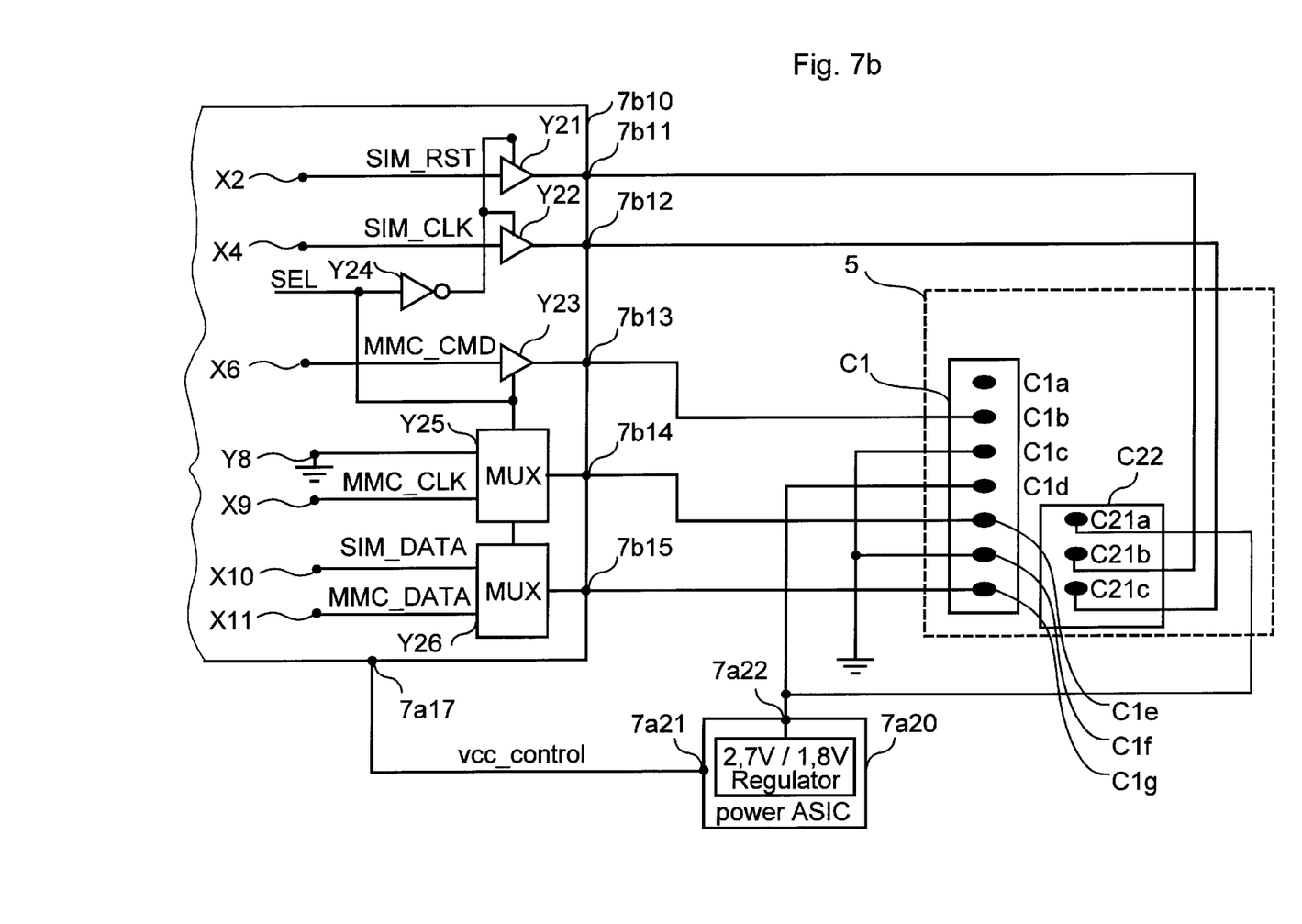
FIG. 7b presents the connection of the group connector of FIG. 2b to an ASIC-circuit controlling it.

FIG. 7b presents the connection of the group connector in FIG. 2b to the second ASIC-circuit controlling it. Now the three parallel contacts of the SIM-card have been multiplexed with the three contact pins of the group connector. Said second ASIC-circuit comprises two multiplexed channels that choose the current connection for two out of the three multiplexed contact pins. One of the three multiplexed contact pins is ground regardless of whether a SIM- or an MMC-card is used. Power supply is preferably, but not essentially arranged in such a way that the supply voltage of the SIM-card is not fed from the common power supply of the SIM- and MMC-cards, when an MMC-card is in place. The connections of the contact pins meant for use of SIM- and MMC-cards are presented in table IV.

TABLE IV

Connections of the contact pins according to the arrangement in FIG. 2b

| Channel reference | Channel | 3-state buffer/ Multiplexer | Output | Contact pin |
|---|---|---|---|---|
| X6 | MMC_CMD | Y23 | 7b13 | C1b |
| — | GROUND | — | — | C1c |
| Y8 | GROUND/ | Y25 | 7b14 | C1e |
| X9 | MMC_CLK |  |  |  |
| — | GROUND | — | — | C1f |
| X10 | SIM_DATA/ MMC_DATA | Y26 | 7b15 | C1g |
| X11 | SIM_RST | Y21 | 7b11 | C21b |
| X4 | SIM_CLK | Y22 | 7b12 | C21c |
| — | 2.8V/1.8V | ASIC 7a20 | 7a22 | C21a & C1d |

Said second ASIC-circuit controls the 3-state buffers Y21–Y23 and the multiplexers Y25 and Y26 according to the type of the current interface card. E.g. when using a SIM-card the multiplexers select SIM-specific channels GROUND and SIM_DATA to be connected to contact pins C1e and C1g and the 3-state buffers are switched to conduct and the 3-state buffer Y23 is closed. Similarly, when using an MMC-card the 3-state buffers Y21 and Y22 are closed and Y23 is switched to conduct and the multiplexers select the lower options in the table, i.e. MMC_CLK and MMC_DATA.

Figure 7C:
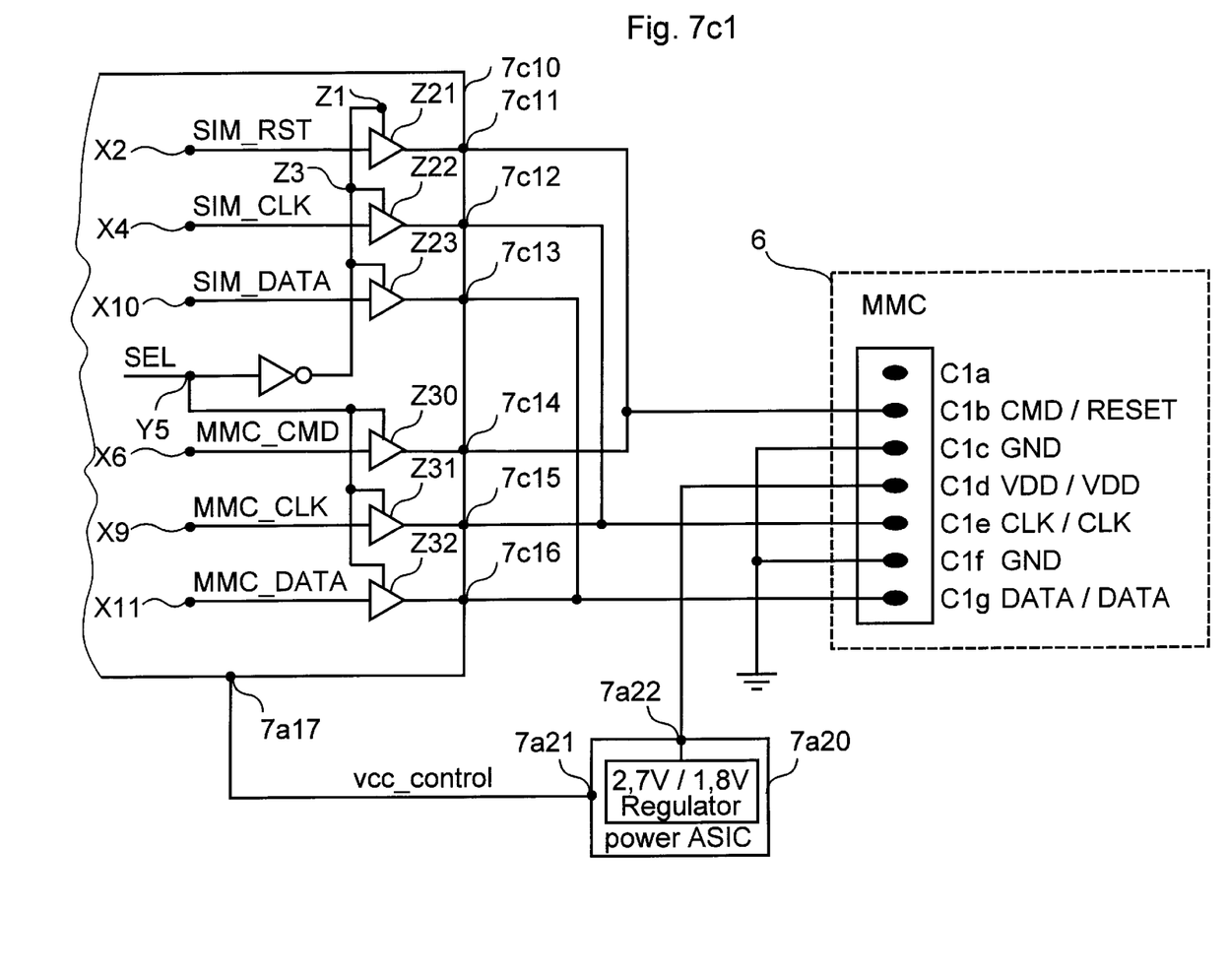

FIG. 7c1 presents a first connection of the group connector in FIG. 2c to the third ASIC-circuit 7c10 controlling it. Six out of the seven contact pins of the third group connector, meant for an MMC-card, have been multiplexed to use SIM-cards. In this embodiment multiplexing has been implemented solely by using 3-state buffers. The connections of the contact pins have been presented in table III. For the channels X2, X4 and X10 needed to use a SIM-card there are 3-state buffers Z21, Z22 and Z23 in a corresponding order. For the channels X6, X9 and X11 of an MMC-card there are corresponding 3-state buffers Z30, Z31 and Z32. These have been arranged to receive a control opposite to each other, which means that when using a SIM-card the 3-state buffers Z21–Z23 become conductive and the 3-state buffers Z30–Z32 are closed. The power supply has been arranged here as in previous cases with a separate regulator power ASIC 7a21, which supplies a supply voltage depending on the type of the current interface card into the fourth contact pin C1d of the third group connector. Ground has been connected to the third group connector as presented in the explanation of FIG. 7b. The connections of the contact pins in one first arrangement of the group connector in FIG. 2c have been presented in table V.

TABLE V

The connection of the contact pins in one first arrangement of a group connector according to FIG. 2b

| Channel name | Channel reference | Selector | Output | Contact pin |
|---|---|---|---|---|
| SIM_RST/ | X2/ | Z21/ | 7c11/ | C1b |
| MMC_CMD | X6 | Z30 | 7c14 |  |
| SIM_CLK/ | X4/ | Z22/ | 7c12/ | C1e |
| MMC_CLK | X9 | Z31 | 7c15 |  |
| SIM_DATA/ | X10/ | Z23 | 7c13/ | C1g |
| MMC_DATA | X11 | Z23 | 7c17 |  |
| GROUND |  |  |  | C1c |
| GROUND |  |  |  | C1f |

TABLE V-continued

The connection of the contact pins in one first arrangement of a group connector according to FIG. 2b

| Channel name | Channel reference | Selector | Output | Contact pin |
|---|---|---|---|---|
| Vcc_control | 7a17 | 7a22 (power supply ASIC) | 7a22 | C1d |

Figure 7C:
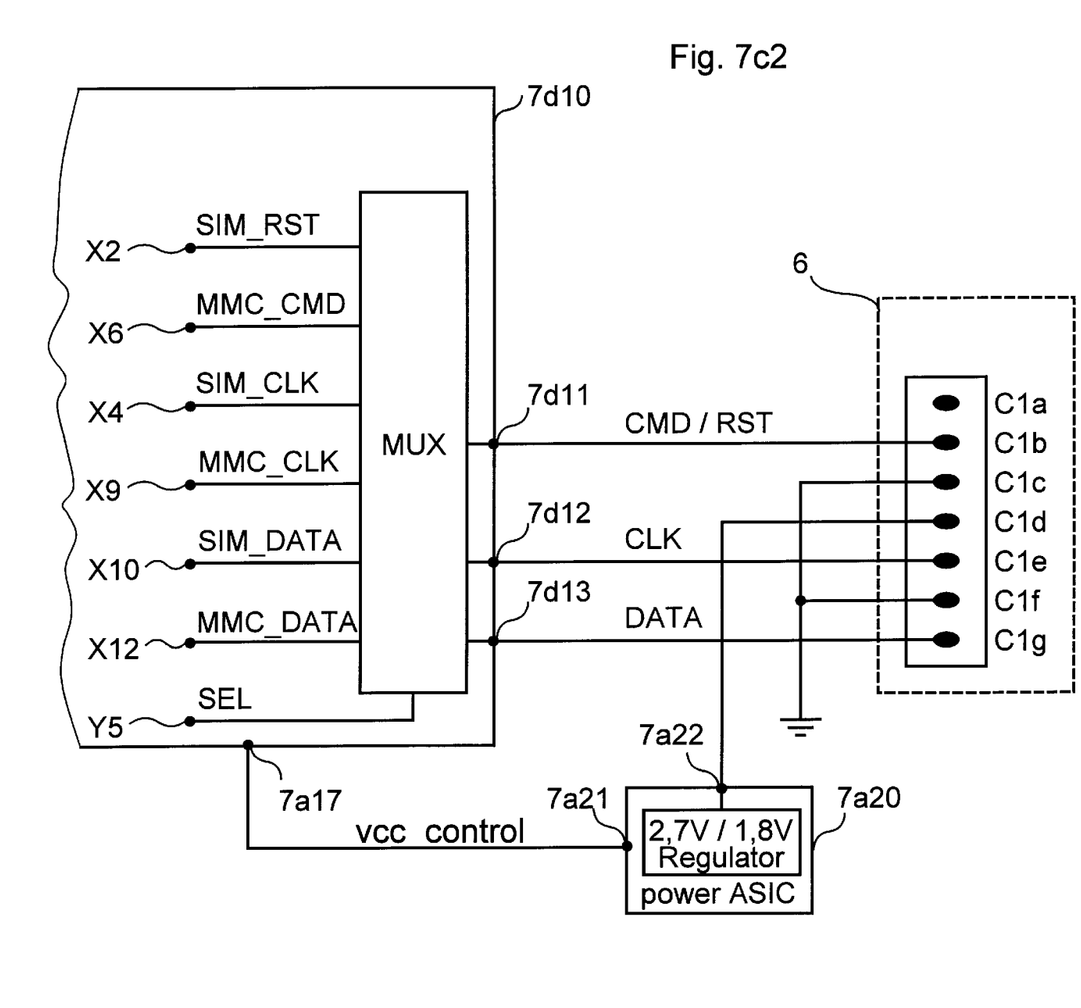

FIG. 7c2 presents a second connection of the group connector of FIG. 2c to a fourth ASIC-circuit 7d10 controlling it. The connection is otherwise corresponding to that in FIG. 7a1, but instead of 3-state buffers one three-pair multiplexer MUX is used. The fourth ASIC, then, has only three outputs in addition to the control output of the power supply ASIC. The output 7d11 for MMC_CMD & SIM_RST channels has been connected to contact pin C1b, output 7d12 has been connected to contact pin C1e for channels MMC_CLK & SIM_CLK and output 7d13 has been connected to contact pin C1g for channels MMC_DATA & SIM_DATA.

Figure 8:
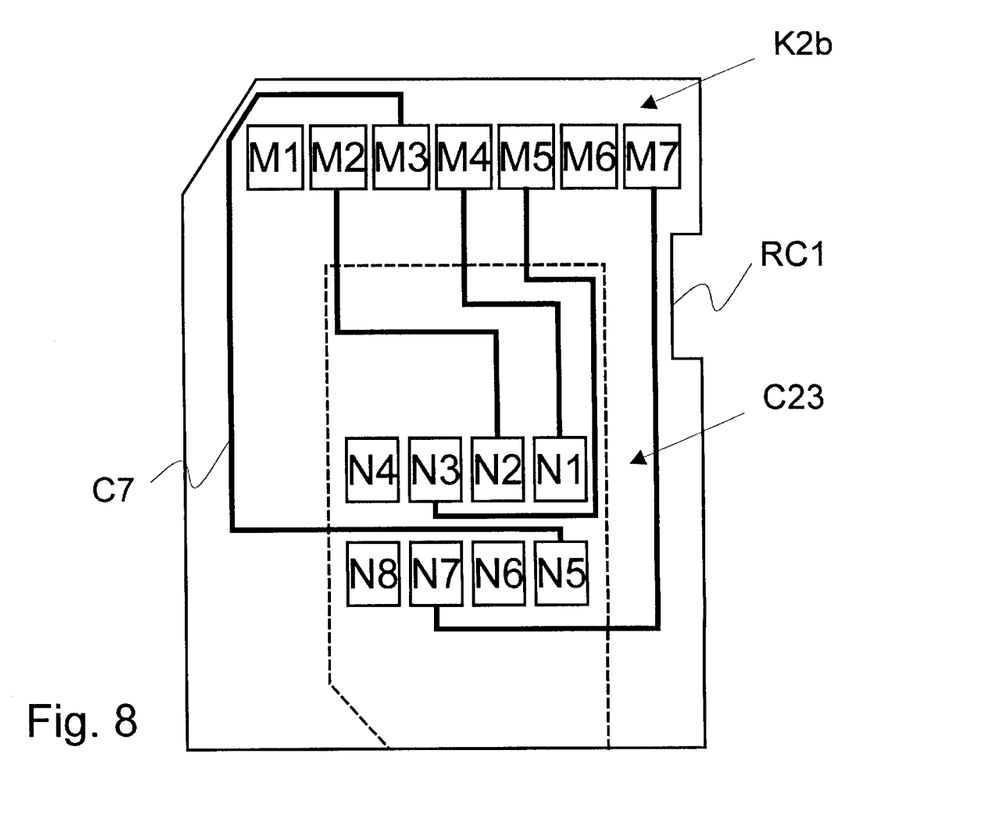
FIG. 8 presents the connection of the adapter card of FIG. 3c.

FIG. 8 presents a preferable embodiment connection of the adapter card 7 in FIG. 3c. The adapter card is preferably made of plastic and leads to contact pins meant for connecting a SIM-card have been arranged inside it. The connections of the contact pins of the adapter card are presented in table VI.

TABLE VI

Connections of contact pins on adapter card 7

| SIM-card contact pins | MMC-card contact pins |
|---|---|
| N1 (voltage supply) | M4 (voltage supply) |
| N2 (card reset) | M2 (command line) |
| N3 (clock signal) | M5 (clock signal) |
| N5 (ground) | M3 (ground) |
| N7 (data I/O) | M7 (data I/O) |

A recess RC1 has also been formed to the side of the card. With the recess it is possible to indicate by mechanical recognition the adapter card connected to the interface card slot. This can be implemented in several ways known to a person skilled in the art, e.g. by installing a microswitch into the side wall of the interface card slot in the position corresponding to the recess RC1 on the adapter card (presented in FIG. 9). An ordinary MMC-card presses the microswitch with its side, whereas the recess in the side of the adapter card allows the moving part of the microswitch to separate itself from the sidewall of the interface card slot.

Figure 9:
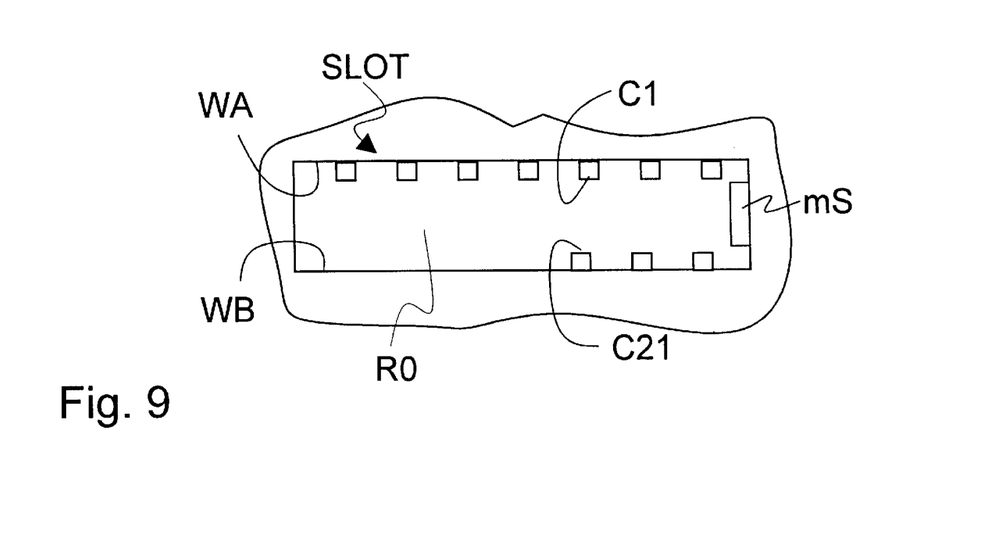
FIG. 9 presents an interface card slot of a mobile station according to the present invention, enlarged and viewed from the side.

FIG. 9 presents a magnified side view of an interface card slot of a mobile station according to the present invention. The figure presents an interface card slot SLOT in the side of a mobile station. A space R0 that looks rectangular from the edge of the interface card slot is confined by four sidewalls. The widest walls, i.e. the walls at least the width of an MMC-card have been marked with references WA and WB. A connector row C1 has been installed on the wall WA to make contact to the contact surfaces of an MMC-card to be placed in the interface card. An MMC-card is placed in the interface card slot with contact surfaces facing the wall WA. The connector group C21 has been installed on the wall WB in order to use a SIM-card. Thus a SIM-card must be placed in a way opposite to an MMC-card, i.e. with the contact surfaces facing wall WB. In this way it is possible to adapt different interface cards in same interface card slot without having to multiplex contact pins.

FIG. 9 also presents a microswitch $\mu$S meant for recognition of adapter card, unnecessary in this embodiment. The figure illustrates how the microswitch can be attached to the side of the space R0 to be used in the second or third embodiment of the present invention.

In this explanation and in the patent claims, unless the contexts otherwise requires, the word "comprises" and modified forms such as "comprising" is understood to mean inclusion of a named entity or phase or entities or group of phases, and not exclusion of any other entity or phase or entities or groups of phases.

This has been a presentation of implementation and embodiments of the present invention with the help of examples. It is evident to a man skilled in the art that the present invention is not confined to the details of the embodiments presented above and that the present invention can be implemented in an other form without deviating from the characteristics of the present invention. The embodiments presented should be viewed as illuminating, but not restrictive. For example, the pitch of the connectors presented earlier, corresponding to the contact surfaces of SIM- and MMC-cards does not necessarily have to be exactly the same as the pitch on these cards, as long as the connectors make contact with the contact surfaces corresponding to them. From the point of view of the invention it is also meaningless, whether, in addition to the interface card slot common to SIM- and MMC-cards, there are other interface card slots in the device or whether the interface card slot according to the present invention is the only interface card slot in the device. In this way the implementation and use possibilities of the present invention are only confined by the enclosed patent claims. In this way the different alternative implementations of the present invention defined by the patent claims as well as equivalent implementations also belong to the area of the invention.

What is claimed is:

1. A mobile station comprising:
    an interface card slot for using an MMC-multimedia card, the MMC multimedia card having a first group of contact surfaces for data transfer and power supply;
    a first voltage supply to supply a first voltage; and
    data transmission means for reading data from and writing data to the MMC-card;
    wherein the interface card slot also includes:
        walls defining a first space for at least partly receiving the MMC-card;
        a first attaching means for attaching the MMC-card removably into the first space;
        a first connecting means for connecting the first voltage to a supply contact surface of the MMC-card; and
        a second connecting means for connecting the data transmission means to a data contact surface of the MMC-card,
    wherein the mobile station further comprises:
        a second attaching means for attaching a SIM-card (Subscriber Identification Module) removably into said first space, the SIM-card having a second group of contact surfaces;
        a second voltage supply for supplying a second voltage;
        a third connecting means for connecting said second voltage to a supply contact surface of the SIM-card; and
        a fourth connecting means for connecting the data transmission means to a data contact surface of the SIM-card,
        wherein the first and second connecting means comprise first contact pins and the third and fourth connecting means comprise second contact pins, and further wherein at least some the first and second contact pins are multiplexed.

2. The mobile station according to claim 1, wherein the first contact pins are grouped to correspond at least to some of the contact surfaces of the MMC-card, and further wherein individual ones of the first contact pins are arranged to flexibly press against individual ones of said some of the contact surfaces of the MMC-card when the MMC-card is received in the first space.

3. The mobile station according to claim 2, wherein the third and fourth connecting means comprise second contact pins grouped to correspond at least to some of the contact surfaces of the SIM-card,
- wherein individual ones of the second contact pins are arranged to flexibly press against individual ones of said some of the contact surfaces of the SIM-card when the SIM-card is attached in the first space, and
- wherein the SIM-card, when attached in the first space, settles in such a position that a subset of said first contact pins make contact with a first subset of the contact surfaces of the SIM-card placed in one row, and said second contact pins make contact with a second subset of the contact surfaces of the SIM-card.

4. A mobile station according to claim 2, wherein said walls comprise a first wall and a second wall which are opposite to each other, in a plane of an interface card placed in the first space;
- said first and second connecting means are positioned proximate said first wall;
- said third and fourth connecting means are positioned proximate said second wall; and
- the MMC-card is adapted to be placed with the first group of contact surfaces against said first wall and the SIM-card is adapted to be placed with the second group of contact surfaces against said second wall in order to fit contact surfaces of the interface card to the first, second, third, and fourth connecting means.

5. The mobile station according to claim 1, wherein the second contact pins are grouped to correspond at least to some of the contact surfaces of the SIM-card, and further wherein individual ones of the second contact pins are arranged to flexibly press against individual ones of said some of the contact surfaces of the SIM-card when the SIM-card is attached in the first space.

6. The mobile station according to claim 1, wherein said mobile station comprises selecting means for selecting the voltage supply to be used.

7. A mobile station comprising
- an interface card slot for using an MMC-multimedia card, the MMC multimedia card having a first group of contact surfaces for data transfer and power supply;
- a first voltage supply to supply a first voltage; and
- data transmission means for reading data from and writing data to the MMC-card;
- wherein the interface card slot also includes:
  - walls defining a first space for at least partly receiving the MMC-card;
  - a first attaching means for attaching the MMC-card removably into the first space;
  - a first connecting means for connecting the first voltage to a supply contact surface of the MMC-card; and
  - a second connecting means for connecting the data transmission means to a data contact surface of the MMC-card,
- wherein the mobile station further comprises:
  - a second attaching means for attaching a SIM-card (Subscriber Identification Module) removably into said first space, the SIM-card having a second group of grouped contact surfaces;
  - a second voltage supply for supplying a second voltage;
  - a third connecting means for connecting said second voltage to a supply contact surface of the SIM-card;
  - a fourth connecting means for connecting the data transmission means to a data contact surface of the SIM-card, and
  - an adapter substantially corresponding in shape and size to the MMC-card and adapted to be placed into said first space, the adapter including:
    - a second space formed into the bottom of the adapter to receive the SIM-card;
    - a third attaching means for attaching a SIM-card removably to said second space;
    - third contact pins grouped to correspond and to make contact at least to a subset of the second group of grouped contact surfaces of the SIM-card;
    - third contact surfaces grouped in a substantially same way as the contact surfaces on the MMC-card; and
    - fifth connecting means for connecting the third contact pins to said third contact surfaces according to a certain correspondence such that when the SIM-card is received into the second space, the supply contact surface of the SIM-card is connected to at least one of the third contact surfaces and further through the first connecting means to the second voltage supply, and the data contact surface of the SIMcard is connected to at least one of the third contact surfaces and further through the second connecting means to said data transmission means.

8. The mobile station according to claim 7, wherein one contact surface of the adapter is grounded, the mobile station further comprising:
- selecting means for selecting the voltage supply to be used from said first and second voltage supply, wherein as a response to a grounding caused by placing the adapter into said first space the selecting means are arranged to connect the second voltage supply to at least one of said first contact pins to connect said second voltage to a contact surface of the SIM-card.

9. The mobile station according to claim 7, further comprising:
- selecting means for selecting the voltage supply to be used,
- wherein the adapter includes a shape deviating from an MMC-card shape,
- wherein the shape is one of the following: a protrusion and a depression,
- wherein the interface card slot includes a switch which recognizes the shape and is adapted to indicate an adapter present in the interface card slot to the means for selecting, and
- wherein the means for selecting have been arranged to select a voltage suitable for the SIM-card for the voltage supply as a response to the indication.

10. A mobile station comprising:
- an interface card slot to mechanically and electrically connect to replaceable interface cards, of first type and of a second type, which interface cards have a certain size and contact surfaces according to their type, where the size and grouping of contact surfaces deviate from each other;

a first contact device for making contact to the contact surface of an interface card of the first type;

a second contact device for making contact to the contact surface of an interface card of the second type;

means for attaching an interface card of the first type removably to the interface card slot;

means for attaching an interface card of the second type removably to the interface card slot; and means for indicating the type of the current interface card whether the type is the first interface card or the second interface card based on the difference of the types of interface card, in order to make possible use of the indicated and attached interface card by the mobile station to be used.

11. A mobile station comprising:

a first interface card slot for receiving a first interface card, the first interface card having a first group of contact surfaces; and a second interface card slot for receiving a second interface card, the second interface card a having second group of contact surfaces which differ from the first group, wherein the first interface card slot comprises a first group of contact pins for making contacts to at least two contact surfaces of the first interface card, wherein the second interface card slot comprises a second group of contact pins for making contacts to at least two contact surfaces of the second interface card, and wherein at least one contact pin is a shared contact pin belonging to both the first and second group of contact pins, the mobile station further comprising means for adapting a function of the at least one shared contact pin to be compatible with the interface card placed in the first interface card slot, wherein the means for adapting a function of the at least one shared contact pin to be compatible with the interface card placed in the first interface card slot are adapted to select a supply voltage and to connect the supply voltage to the interface card according to the type of the interface card.

12. The mobile station according to claim 11, wherein the first group of contact surfaces comprise contact surfaces in a number of rows or columns which differ from a number of rows or columns of contact surfaces in the second group of contact surfaces.

13. The mobile station according to claim 11, wherein the first group and the second group of contact surfaces comprise different numbers of contact surfaces.

14. The mobile station according to claim 11, wherein one of the first and second interface card slots is adapted to the other interface card slot.

15. The mobile station according to claim 11, wherein the first and second interface cards have different sizes.

16. The mobile station according to claim 11, wherein one of the first and second interface cards is a SIM-card.

17. The mobile station according to claim 11, wherein one of the first and second interface cards is a memory card.

18. A mobile station comprising:

a first interface card slot for receiving a first interface card, the first interface card having a first group of contact surfaces; and a second interface card slot for receiving a second interface card, the second interface card a having second group of contact surfaces which differ from the first group, wherein the first interface card slot comprises a first group of contact pins for making contacts to at least two contact surfaces of the first interface card, wherein the second interface card slot comprises a second group of contact pins for making contacts to at least two contact surfaces of the second interface card, and wherein at least one contact pin is a shared contact pin belonging to both the first and second group of contact pins, the mobile station further comprising means for identifying an interface card placed in the first interface card slot; and means for adapting a function of the at least one shared contact pin to be compatible with the interface card placed in the first interface card slot, wherein the means for identifying an interface card placed in the first interface card slot are arranged to identify the interface card by a shape of the interface card.

19. A method for using interface cards in a mobile station, comprising:

receiving a first interface card in a first interface card slot, said first interface card having first contact surfaces grouped in a first group;

making contact with a first group of contact pins to at least two of the first contact surfaces; and receiving a second interface card in a second interface card slot, said second interface card having second contact surfaces grouped in a second group, wherein at least one of said contact pins is used as a shared contact pin to make contact to said first and second contact surfaces, the method further comprising adapting a function of the at least one shared contact pin to be compatible with the interface card placed in the first interface card slot; and selecting a supply voltage and connecting the supply voltage to the interface card according to the type of the interface card.

20. A method for using interface cards in a mobile station, comprising:

receiving a first interface card in a first interface card slot, said first interface card having first contact surfaces grouped in a first group;

making contact with a first group of contact pins to at least two of the first contact surfaces; and receiving a second interface card in: a second interface card slot, said second interface card having second contact surfaces grouped in a second group, wherein at least one of said contact pins is used as a shared contact pin to make contact to said first and second contact surfaces, the method further comprising identifying an interface card placed in the first interface card slot by a shape of the interface card.

* * * * *